Dec. 15, 1925.  
C. ANDERSON  
SECTIONAL BRAKE LINING  
Filed Dec. 12, 1924  
1,565,240
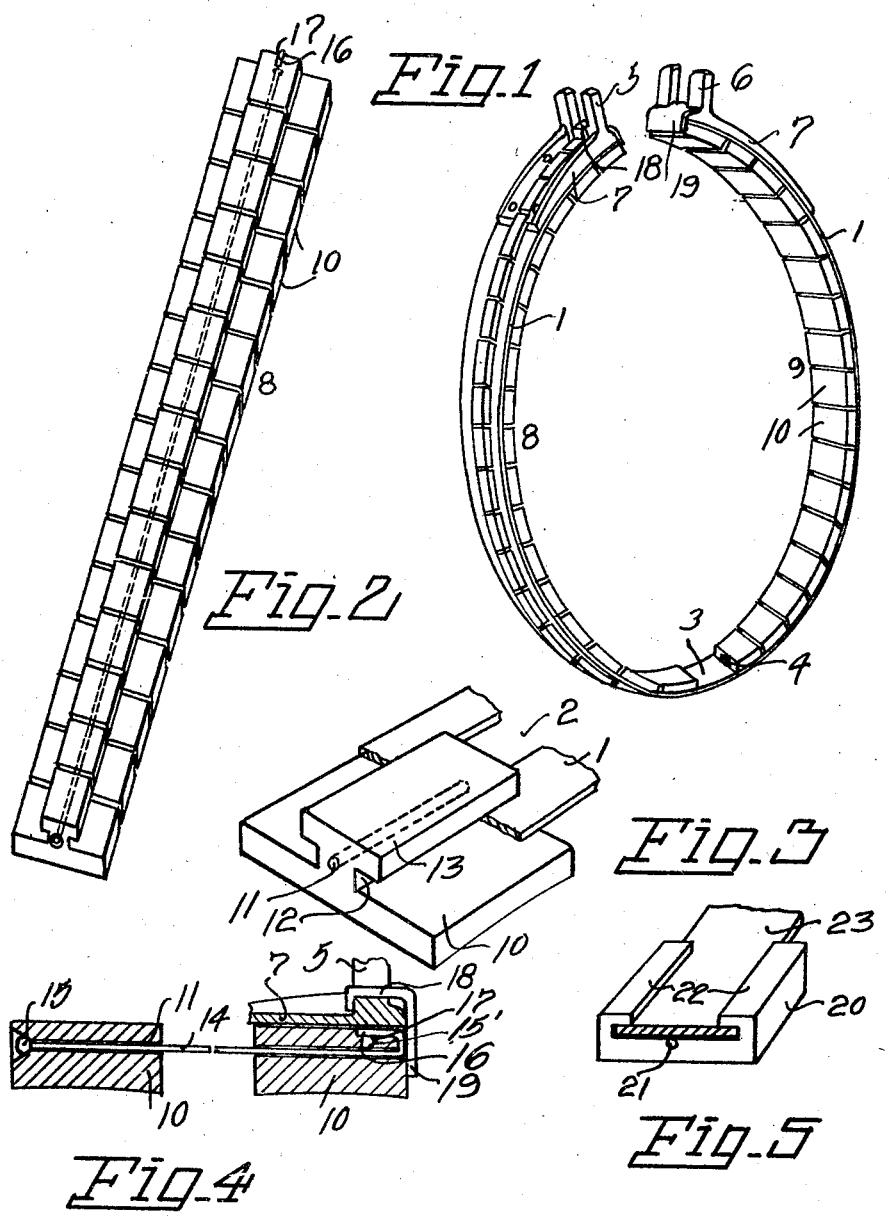
Inventor  
Carl Anderson  
By Herbert E. Smith  
Attorney Patented Dec. 15, 1925.

1,565,240

UNITED STATES PATENT OFFICE.

CARL ANDERSON, OF ROZA, WASHINGTON, ASSIGNOR OF ONE-HALF TO THOMAS C. DOOLITTLE, OF ROZA, WASHINGTON.

SECTIONAL BRAKE LINING.

Application filed December 12, 1924. Serial No. 755,439.

*To all whom it may concern:*

Be it known that I, CARL ANDERSON, a citizen of the United States, residing at Roza, in Kittitas County, and State of Washington, have invented certain new and useful Improvements in Sectional Brake Linings, of which the following is a specification.

My present invention relates to an improved sectional brake lining adapted especially for use with split brake bands of the type employed in automobile transmissions and particularly of the type used in Ford automobiles. The primary object of the invention is the provision of a brake lining of this character made up of similar units that are interchangeable and of standard construction and shape, and coupled together with a flexible wire or cord to form a flexible strip or liner. In the preferred form of my invention I utilize a pair of strips or liners in combination with a split slotted resilient brake band, and means are provided whereby these liner strips may readily be inserted in or withdrawn from the slotted band to facilitate assembly, replacing, and repair of the brake bands. The invention consists in certain novel features of construction and combinations and arrangements of parts as will hereinafter be more fully set forth and claimed.

In the accompanying drawings I have illustrated one complete example and a modified form thereof, of the physical embodiment of my invention wherein the parts are combined and arranged for effectively carrying out the principles of my invention.

Figure 1 is a perspective view of a split brake band equipped with the liner strips of my invention.

Figure 2 is a perspective view of one of the removable liner strips.

Figure 3 is an enlarged perspective view of one of the liner blocks, showing its relation to the split slotted brake band.

Figure 4 is a detail sectional view showing two end blocks of a liner strip, the intermediate blocks being omitted, and the flexible wire or cord forming a connecting strand for the blocks of the liner strip.

Figure 5 is a detail perspective view showing a slightly modified arrangement of liner block and brake band.

The split resilient brake band 1 is fashioned with a pair of circumferentially extending, arcuate slots 2 open at the adjoining ends of the band and terminating at the sides of a central solid portion 3 of the band. At their adjoining terminals these two slots are fashioned with interior, radial, abutments or spurs 4 which are struck up from the metal of the band while in the process of formation.

The adjoining ends of the split ring or band are fashioned with the usual notched lugs 5 and 6 for the reception of the brake rod (not shown), and each notched lug is formed with a bifurcated base flange 7, complementary to the slots of the band, and attached as by rivets to the band.

Two flexible liner strips designated 8 and 9 are used in combination with the slotted brake band, and each of these strips is made up of a series of friction blocks 10, all of standard size and shape and therefore interchangeable, and adapted to be coupled together in suitable numbers to adapt the strips for various lengths as required.

The blocks are fashioned of suitable material for frictional contact with the brake drum or disk, and each block is fashioned with a longitudinally extending bore or passage 11, and a pair of lateral grooves 12 undercut at the opposite sides of a longitudinally extending guide and retaining tongue 13 which at its lateral edges projects over the undercut grooves.

The perforated blocks are threaded upon a flexible strand 14 which may be a wire, cord, cable, or other single member for retaining the blocks in a "string" or strip, and one end of the strand is provided with a retaining head 15 for the first block threaded on the strand. The last block on the strand is preferably provided with a grooved head 15 for co-action with the bent or hooked end 16 of the strand, and a short groove 17 may be formed in the block for reception of the end of the hook, or hooked end of the strand.

The friction blocks are each formed with a rubbing face curved to conform to the periphery of the disk or drum and the blocks are threaded or strung on the strand in succession to form a liner strip as indicated in Figure 2. The two strips are inserted in the slotted brake band in opposite directions, through the bifurcated base flanges, and the lateral grooves 12 of the blocks slide along the side walls of the groove or slot until the foremost block encounters an abutment 4 of the brake band. The adjoining ends of the two strips are then locked in position by means of a key as indicated in Figure 4. This key comprises a resilient hook 18 adapted to be pressed into frictional contact with the notched lugs as 5 and 6, and the key is fashioned with an integral retaining flange 19 disposed at an angle to the hook for engagement with the end of the last block on the strand as seen in Figure 4. The locking key thus retains the liner strip in operative position against the abutment 4 and the strip is held in proper relation to the disk or drum with which it co-acts. By using a tool for the purpose the locking key may be sprung from its locked position after which the liner strip may be slidably withdrawn from the slotted brake band for repair or replacement, and when again assembled the strip is locked in place by the same key.

In the modified form of the invention in Figure 5, the friction block 20 is perforated at 21 for the strand, and said block is fashioned with opposed overhanging flanges 22 to slide along and be retained on the opposite edges of the brake band 23. This structure may be substituted in some instances for the construction heretofore described.

It will be apparent that the liner strips thus constructed may with facility be assembled from the friction blocks in suitable numbers, and that the strips may with equal facility be inserted in or withdrawn from the brake band as required.

Having thus fully described my invention what I claim as new and desire to secure by Letters Patent is—

1. The combination with a slotted brake band, a flexible liner strip comprising a series of perforated friction blocks, a flexible strand passing successively through said blocks, means for securing the ends of said strand, and guiding and retaining means on said blocks for co-action with said brake band.

2. The combination with a slotted brake band, a flexible liner strip comprising a series of perforated friction blocks, a flexible strand passing successively through said perforated blocks, means for securing the ends of said strand to the end blocks of the strip, and retaining tongues on said blocks having undercut guide grooves for co-action with said slotted brake band.

3. The combination with a slotted brake band, a flexible liner strip comprising a series of perforated friction blocks, a single flexible strand passing successively through said blocks, a retaining head at one end of said strand for engagement with a block, a retaining hook at the other end of the strand for engagement with a block, and retaining tongues on said blocks having undercut guide grooves for co-action with said slotted brake band.

4. The combination with a slotted brake band having a notched lug and a bifurcated base flange on the lug, of a flexible liner strip comprising a series of perforated friction blocks, a flexible strand passing through said blocks and retaining means at the ends of said strand for said blocks, means on the blocks for slidably engaging the slotted band, an abutment on the band, and a locking key for co-action with said notched lug for retaining one end of the strip.

In testimony whereof I affix my signature.

CARL ANDERSON.